United States Patent
Kitamura

(10) Patent No.: US 9,583,910 B2
(45) Date of Patent: Feb. 28, 2017

(54) DIFFRACTION GRATING, LASER APPARATUS, AND MANUFACTURING METHOD FOR DIFFRACTION GRATING

(71) Applicant: CANON KABUSHIKI KAISHA, Tokyo (JP)

(72) Inventor: Tsuyoshi Kitamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 14/641,890

(22) Filed: Mar. 9, 2015

(65) Prior Publication Data
US 2015/0255946 A1    Sep. 10, 2015

(30) Foreign Application Priority Data

Mar. 10, 2014  (JP) .................. 2014-045908

(51) Int. Cl.
| | |
|---|---|
| *G02B 5/18* | (2006.01) |
| *H01S 3/08* | (2006.01) |
| *H01S 3/034* | (2006.01) |
| *H01S 3/225* | (2006.01) |
| *H01S 3/13* | (2006.01) |

(52) U.S. Cl.
CPC ........ *H01S 3/08009* (2013.01); *G02B 5/1852* (2013.01); *G02B 5/1861* (2013.01); *H01S 3/034* (2013.01); *H01S 3/1305* (2013.01); *H01S 3/2251* (2013.01)

(58) Field of Classification Search
CPC ... G02B 5/1861; G02B 5/1866; G02B 5/1814
USPC ................. 359/569, 571, 572, 566
See application file for complete search history.

(56) References Cited

U.S. PATENT DOCUMENTS

| | | | | |
|---|---|---|---|---|
| 6,067,197 A | * | 5/2000 | Blasiak ............... | G02B 5/1861 359/569 |
| 6,511,703 B2 | | 1/2003 | Pan et al. | |
| 6,762,881 B2 | * | 7/2004 | Kleemann ........... | G02B 5/1861 359/566 |
| 6,958,859 B2 | * | 10/2005 | Hoose ................. | G02B 5/1861 359/566 |

(Continued)

FOREIGN PATENT DOCUMENTS

| | | |
|---|---|---|
| EP | 2579072 A2 | 4/2013 |
| JP | 4549019 B2 | 9/2010 |

OTHER PUBLICATIONS

European Search Report issued in EP15000643.5 dated May 19, 2015.

*Primary Examiner* — Audrey Y Chang
(74) *Attorney, Agent, or Firm* — Rossi, Kimms & McDowell LLP

(57) ABSTRACT

This diffraction grating is a reflection-type diffraction grating that has a grating, the cross section of which is an asymmetrical triangular shape, and wherein given that $\theta$ denotes an angle between a short side and a base of the triangular shape, and $\phi$ denotes an angle between the short side and a long side of the triangular shape, and $\alpha$ denotes an incident angle of light to a normal of the base, the angles $\theta$ and $\phi$ satisfy a condition represented by the following formulas:

$\phi + \theta \leq 90 + \alpha$, $0.1127291(\phi-\phi_d)^2 - 19.67453(\phi-\phi_d) + 938.74 + \theta_d \leq \theta \leq 0.36631(\phi-\phi_d) + 48.84 + \theta_d$ where $\phi_d = 0.845\sigma$ and $\theta_d = 1.065\sigma$, in $\sigma = \alpha - 79.25$.

6 Claims, 7 Drawing Sheets

(56) References Cited

U.S. PATENT DOCUMENTS

| | | | |
|---|---|---|---|
| 8,441,729 B2* | 5/2013 | Kleemann | G02B 5/1861 359/566 |
| 2010/0328775 A1 | 12/2010 | Kleemann | |
| 2013/0089118 A1 | 4/2013 | Kitamura et al. | |

* cited by examiner

DIFFRACTION GRATING, LASER APPARATUS, AND MANUFACTURING METHOD FOR DIFFRACTION GRATING

BACKGROUND OF THE INVENTION

1. Field of the Invention

The present invention relates to a diffraction grating, a laser apparatus, and a manufacturing method for the diffraction grating.

2. Description of the Related Art

Conventionally, there is a diffraction grating used in an ArF or Krf excimer laser apparatus as a reflection-type diffraction grating, which is used, for example, for dispersing a wavelength of far ultraviolet rays. Such a diffraction grating is used as a band-narrowing element and acts as a kind of a resonator by combining an output mirror in a discharge chamber. Here, the high proportion of light quantity that returns at a predetermined order upon the reflection, that is, high diffraction efficiency, is important for utilizing incident light without being wasted as far as possible, and for acquiring a preferable operation of the laser apparatus. Accordingly, the diffraction grating for the excimer laser apparatus commonly has an asymmetrical triangle shape for converging light at a specific order. Japanese Patent No. 4549019 discloses a diffraction grating for realizing an increase reflection by forming a protective layer on a reflective layer, in order to further enhance the diffraction efficiency. However, the diffraction efficiency depends on the grating shape of a single asymmetrical triangle grating, and therefore the grating shape must be suitable for the efficiency when trying to enhance the efficiency according to the condition of a film. Accordingly, U.S. Patent Publication No. 2010/0328775 discloses a method for enhancing the efficiency by performing the angle setting of interior angles of the triangle where the light is incident to a long side of the triangle, while the diffraction grating is commonly used in a condition in which the light is incident to only a short side of the asymmetrical triangle grating.

A surface (what is referred to as a "counter surface") corresponding to a long side in the grating to be actually manufactured requires surface accuracy that is equivalent to a surface (what is referred to as a "blaze surface") corresponding to the short side, in order to achieve a high efficiency by using the method disclosed in U.S. Patent Publication No. 2010/0328775. Here, a metal mold used when manufacturing (molding) the diffraction grating for the excimer laser apparatus is commonly formed by plastic working or by cutting. The plastic working has a principle that a deformation is performed by applying pressure, and therefore acquiring high accuracy for both the processed surfaces of the counter surface and the blaze surface is difficult. In the cutting, the counter surface is finished by a process of "rough path" that has a large cutting volume, and therefore the surface accuracy is not preferable. Additionally, when a finishing path is also applied to the counter surface in a manner similar to the blaze surface so as to reduce the cutting volume, the top of the blaze surface, which is connected to the counter surface to be finished, may collapse, causing an abnormality of the grating shape, and the result is not preferable because of causing a factor for lowering the efficiency. That is, while the diffraction grating may have a preferable shape in the design, the actual manufacturing is difficult.

SUMMARY OF THE INVENTION

The present invention provides, for example, a diffraction grating having high diffraction efficiency and which is easily manufactured.

The present invention is a reflection-type diffraction grating that has a grating, the cross section of which is an asymmetrical triangular shape, and wherein given that $\theta$ denotes an angle between a short side and a base of the triangular shape, and $\phi$ denotes an angle between the short side and a long side of the triangular shape, and a denotes an incident angle of light to a normal of the base, the angles $\theta$ and $\phi$ satisfy a condition represented by the following formulas:

$$\phi + \theta \leq 90 + \alpha,$$

$$0.1127291(\phi - \phi_d)^2 - 19.67453(\phi - \phi_d) + 938.74 + \theta_d \leq \theta \leq 0.36631(\phi - \phi_d) + 48.84 + \theta_d$$

where $\phi_d = 0.845\sigma$ and $\theta_d = 1.065\sigma$, in $\sigma = \alpha - 79.25$ Further features of the present invention will become apparent from the following description of exemplary embodiments (with reference to the attached drawings).

DESCRIPTION OF THE EMBODIMENTS

Hereinafter, preferred embodiments of the present invention will be described with reference to the drawings.

First Embodiment

Firstly, a description will be given of a diffraction grating according to first embodiment of the present invention. The diffraction grating according to the present embodiment is a reflection-type diffraction grating having a reflective layer and a cross-sectional structure in which asymmetrical triangle shapes are continuously disposed. The diffraction grating is used, for example, for an ArF excimer laser apparatus (used for dispersing light upon generation of ArF excimer laser light), and also acts as a kind of a resonator by combining an output mirror in a discharge chamber, in parallel with narrowing the band.

Figure 1:
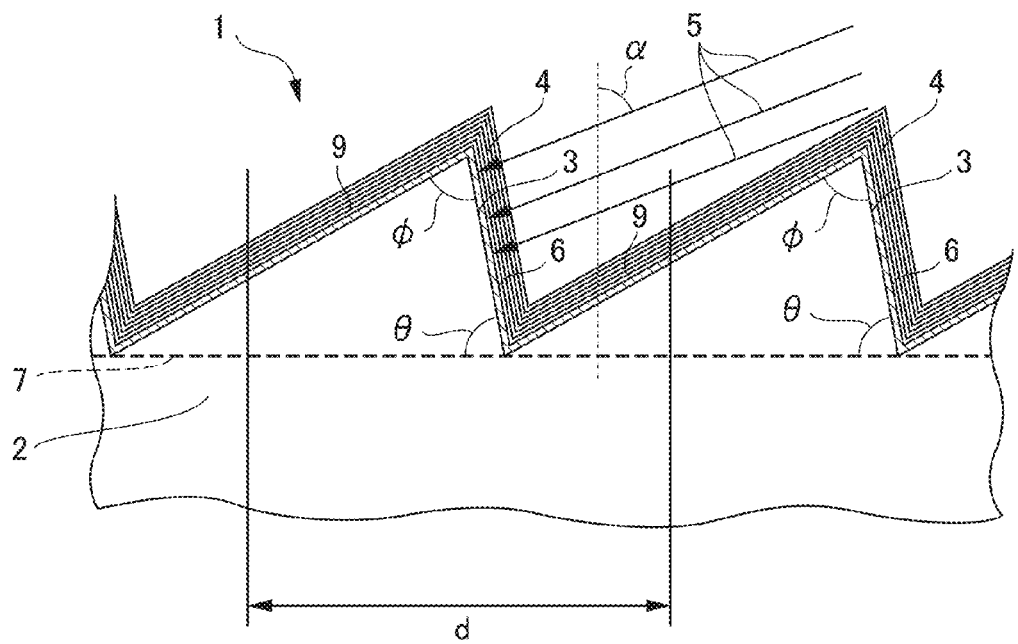
FIG. 1 illustrates a configuration and a shape of a diffraction grating according to a first embodiment of the present invention.

FIG. 1 is a schematic cross-sectional diagram illustrating a configuration and a shape of a diffraction grating 1. The diffraction grating 1 has a resin layer 2, a metal layer 3, and a dielectric layer 4. The resin layer 2 is the main body of the diffraction grating 1 molded by a metal mold for manufacturing the diffraction grating, and its material is an acryl resin, an epoxy resin or the like. The metal layer 3 is a reflective layer (reflective film) disposed on the resin layer 2, configured of a metal such as aluminum or the like. The dielectric layer 4 is a protective layer (protective film) disposed on the metal layer 3, configured of a dielectric for protecting the metal layer 3 from oxidation and the like. $MgF_2$, $LaF_3$ or $AlF_3$ are suitable for the material of the dielectric, and the dielectric layer 4 specifically has a structure consisting of a single layer or a plurality of layers thereof. Noted that FIG. 1 illustrates an example in which the dielectric layer 4 has a six-layer structure. Additionally, with reference to the asymmetrical triangular shape of the surface of the metal layer 3, a blaze surface 6 is an surface to which light rays 5 are incident that corresponds to a short side of the surface, a blaze angle θ is an angle between the blaze surface 6 and a grating plane 7 of the diffraction grating 1 (a base of the triangle shape), and a counter surface 9 is a surface corresponding to a long side of the surface. Furthermore, "φ" is a vertex angle, and "d" is a repeated length (grating interval) of the grating shape. A high proportion of the light quantity that returns at a predetermined order upon the reflection, that is, high diffraction efficiency is important for efficiently utilizing the light rays 5, and the diffraction efficiency depends significantly on the blaze angle θ and the vertex angle φ that are interior angles of the triangle shape. Typically, the condition of the interior angles for optimizing the calculated efficiency is that the vertex angle φ is in the range between 88.5 degrees and 91.5 degrees, and the blaze angle θ is in the range between 82 degrees and 86 degrees.

Figure 7:
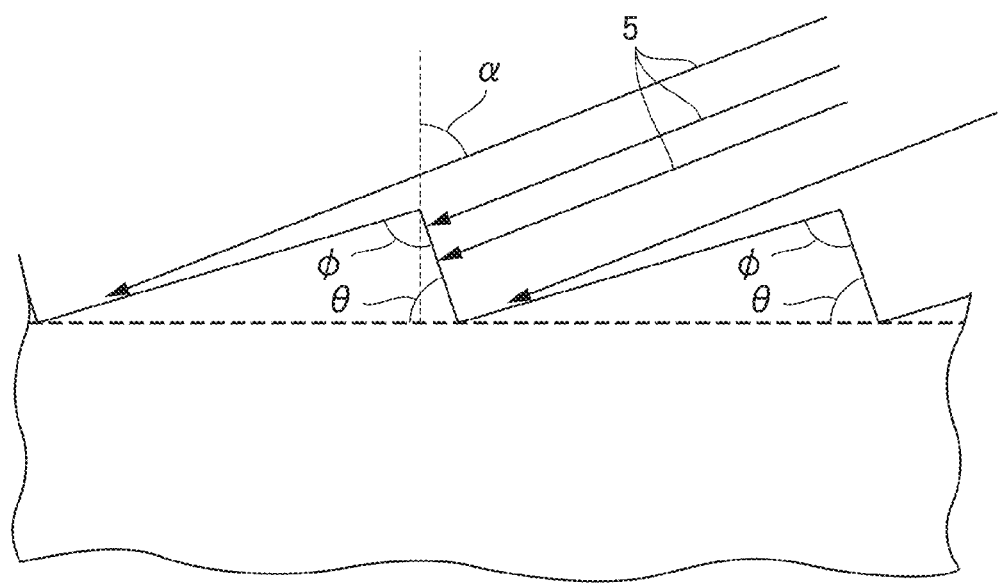
FIG. 7 illustrates a manner where light rays are incident to a blaze surface and a counter surface.

Next, a description will be given of a condition of the interior angles for enhancing the diffraction efficiency of the diffraction grating 1 (hereinafter referred to as "interior angles condition with high efficiency"). First, a description will be given of the manufacture of the diffraction grating in which the light rays 5 are incident to the counter surface in addition to the blaze surface as a reference, before the description of the interior angles condition with high efficiency in the present embodiment. FIG. 7 is a schematic cross-sectional diagram illustrating a manner where the light rays 5 are incident to the blaze surface 6 and the counter surface 9. Note that, in FIG. 7, the same reference numerals are provided for each of the elements corresponding to each of the elements of the diffraction grating 1 according to the present embodiment in order to simplify the description, and the notation of the metal layer 3 and the dielectric layer 4 is omitted. Here, an angle where the light rays 5 are incident to the diffraction grating 1 is represented as an incident angle of light rays α (angle normal to the grating plane 7). A condition in which the light rays 5 are incident to the counter surface 9 is that the sum of 90 degrees and the incident angle of light rays α is smaller than that of the blaze angle θ and the vertex angle φ due to the geometrical relation between the light rays 5 and the grating shape (triangular shape). Note that the incident angle of light rays α to the diffraction grating in the ArF excimer laser apparatus is commonly in the range approximately between 78 degrees and 80 degrees.

Figure 8:
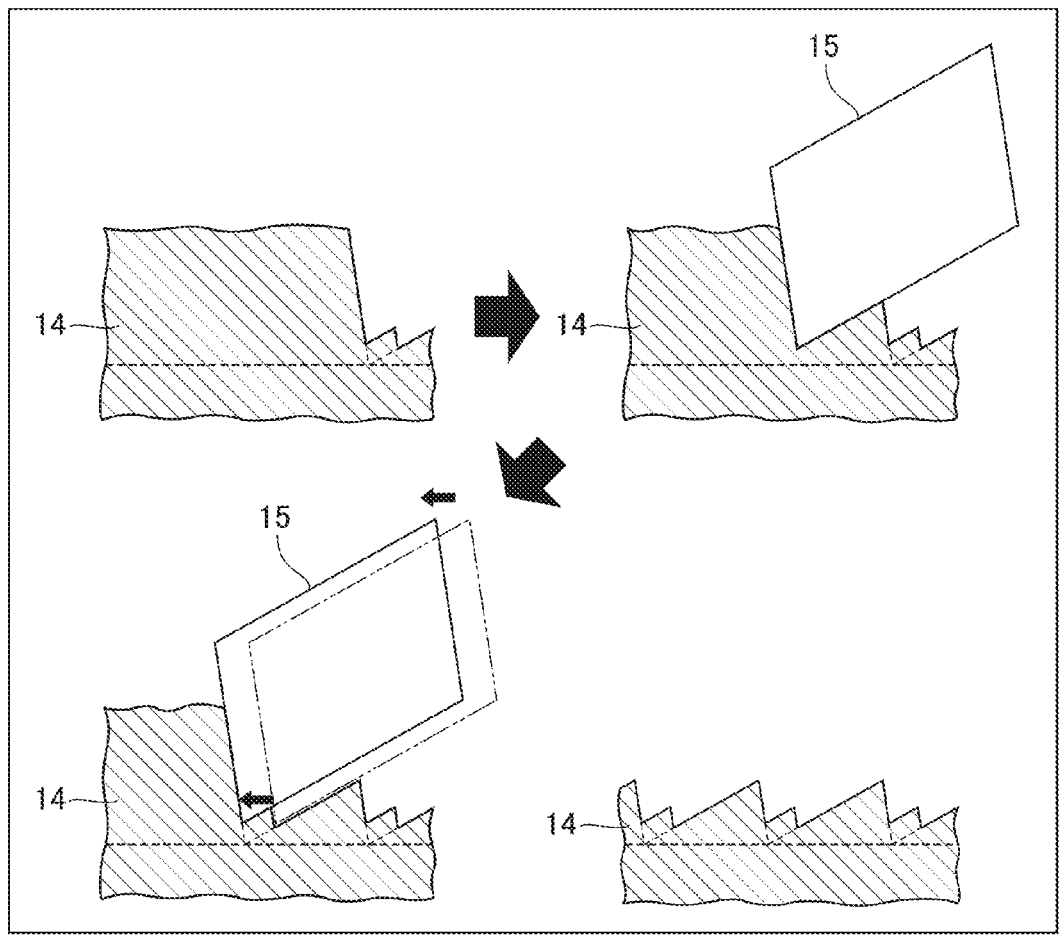
FIG. 8 is a diagram explaining a finishing process of the blaze surface.
Figure 9:
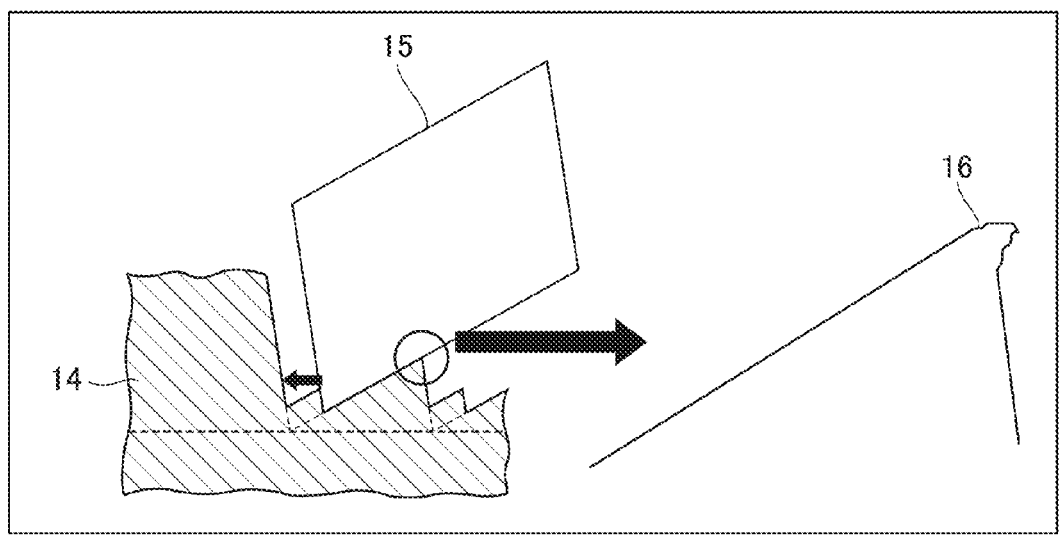
FIG. 9 is a diagram explaining a collapse at a top that may occur during the finishing process of the counter surface.

Next, a description will be given of a manufacturing method of the metal mold used for manufacturing the diffraction grating in the art where the light rays 5 are incident to the counter surface in addition to the blaze surface. The standard processing methods used in the manufacturing of the metal mold for manufacturing the diffraction grating are typically a plastic working or a cutting. The plastic working has a processing principle in which a deformation is performed by applying pressure, and therefore acquiring a high accuracy for both the processed surfaces of the counter surface and the blaze surface is difficult, as described above. In contrast, with reference to the cutting, two surfaces are cut out by a rough process in a metal mold main body 14 when manufacturing the metal mold for manufacturing the diffraction grating assuming a case in which the light rays 5 are incident to only the blaze surface 6, as shown in FIG. 8. Subsequently, a finish process is performed on only the blaze surface 6 in order to increase the surface accuracy on the blaze surface 6. Accordingly, the accuracy of the processed counter surface 9 is significantly lower than that of the blaze surface 6. Here, processing paths increase and the processes are complicated if the finishing process is also performed on the counter surface 9 in order to increase the accuracy of the processed counter surface 9. Additionally, a collapse 16 occurs at the vertex as shown in FIG. 9 because a cutting tool 15 compresses the vertex of the blaze surface 6 adjacent to the counter surface 9 during finishing the counter surface 9. The shape abnormality like this collapse 16 not only causes a deterioration of the diffraction efficiency of the diffraction grating to be shaped, but may also cause the problem that the collapse is caught (hooked) while shaping the diffraction grating, and may cause an adverse influence on a wave front property that is an important property of the diffraction grating.

Thus, it is difficult to manufacture the metal mold so as to make the counter surface 9 have a processed surface accuracy equivalent to the blaze surface 6, that is, it is difficult to manufacture the diffraction grating in which the light rays 5 are incident to the counter surface 9 in addition to the blaze surface 6. Accordingly, it is preferable that the light rays 5 are incident to only the blaze surface 6 in order to enhance the diffraction efficiency of the diffraction grating. With reference to the relation between the interior angles and the incident angle of light rays α in this case, the sum of the blaze angle θ and the vertex angle φ is smaller than that of the 90 degrees and the incident angle of light rays α.

Based on the matters described above, the present embodiment sets the condition of the interior angles for enhancing the efficiency of the diffraction grating 1 (interior angles condition with high efficiency) as below. The interior angles condition with high efficiency is determined by calculating an angle (interior angles of the triangle shape) dependence of the diffraction efficiency (hereinafter, referred to as only "efficiency") that is executed by an information processing unit (computer) by using a rigorous coupled-wave analysis (RCWA), which is a type of electromagnetic field analysis method. First, a description will be given of a value that is previously set for calculating angular dependence. The incident angle of light rays α is set at 79.25 degrees. This is because the condition in which the light rays 5 are not incident to the counter surface 9 is that the sum of the blaze angle θ and the vertex angle φ is smaller than the sum of 90 degrees and the incident angle of light rays α as described above, and this results in the sum of the blaze angle θ and the vertex angle φ needing to be smaller than 169.25 degrees. However, the value of 79.25 degrees is an example that serves as a standard for executing a calculation below, and particularly in the present embodiment, the incident angle of light rays α is preferably in the range between 79.1 degrees and 79.5 degrees. Here, the range corresponds to the width of 0.4 nm expressed in terms of laser wavelength, and the range is effective when assuming the use in the ArF excimer laser apparatus.

Additionally, the diffraction grating 1 is used under the condition that an emitted light is reflected in a direction that is the same as the incident light, referred to as a Littrow layout, in the ArF excimer laser apparatus. Here, when a light wavelength is denoted by λ, an order of a reflected light is denoted by m, and a grating interval is denoted by d, the following formula (1) is established:

$$mλ=2d·\sin θ \quad (1)$$

When the light wavelength λ that is excited and discharged by argon-fluorine and irradiated to the diffraction grating 1 is 193.00 nm, and the order m is 105, the grating interval d becomes 10.32953 μm according to the formula (1).

Further, the material of the metal layer 3 is aluminum, and its film thickness is 220 nm. Additionally, the refractive index of aluminum is 0.14+2.35i. Note that the angular dependence calculation below is executed under the condition that the metal layer 3 is disposed as an outermost layer, and it is invariable and effective even when the dielectric layer 4 that is a protective layer is disposed on the metal layer 3, as described in the configuration of the diffraction grating 1.

Figure 2:
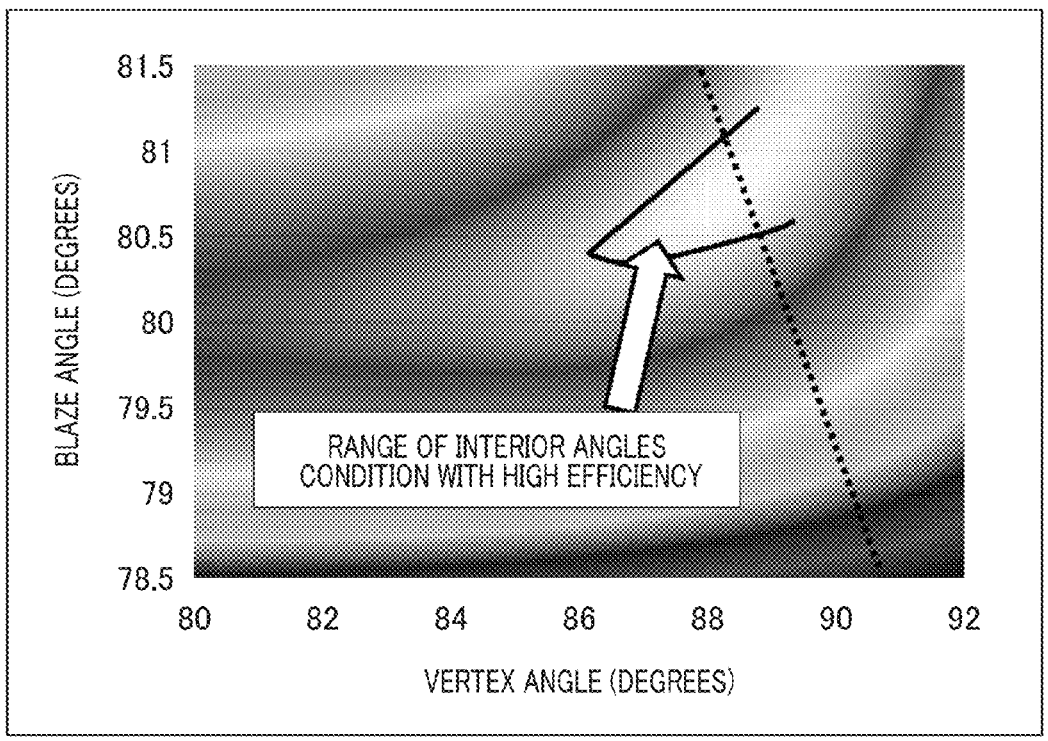
FIG. 2 is a graph illustrating the calculated result of the angular dependence of the efficiency in the first embodiment.

FIG. 2 is a graph illustrating the calculated result of the angular dependence of the efficiency. In FIG. 2, the horizontal axis is the vertex angle ϕ and the vertical axis is the blaze angle θ. Additionally, the axis direction perpendicular to a plane (paper surface) consisting of the horizontal axis and the vertical axis is the efficiency, and it is expressed by using shades. Note that the efficiency on the axis is a value that is standardized with a maximum efficiency of the calculated result. A condition in which the light rays 5 are not incident to the counter surface 9 is represented by formula (2) based on the above description, and an area to the left of dots in the drawing corresponds to the condition:

$$ϕ+θ≤169.25 \quad (2)$$

That is, deriving a high efficiency solution in this area allows obtaining the diffraction grating with high efficiency and involving no difficulty in the manufacture thereof. Here, the term "high efficiency" in the present embodiment defines a case in which the efficiency is 98.5% and above to the maximum efficiency under the above calculation condition shown in FIG. 2. The diffraction grating having this efficiency can be said to have a nearly optimal efficiency and is efficiently advantageous. Then, considering the condition for satisfying the condition with high efficiency in the area shown in FIG. 2, the vertex angle ϕ and the blaze angle θ are provided in the range below.

Figure 3:
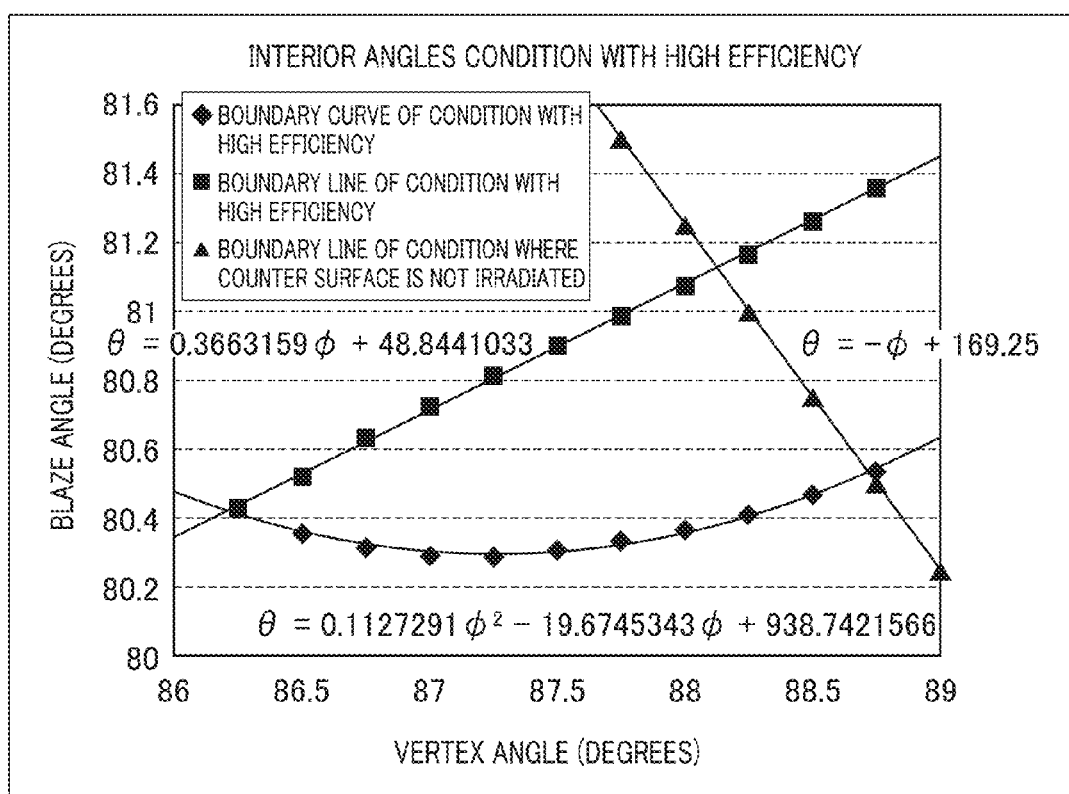
FIG. 3 is a graph illustrating an inner angles condition with high efficiency in the first embodiment.

FIG. 3 is a graph illustrating the interior angles condition with high efficiency determined by the above calculation. Specifically, a range for satisfying the interior angles condition with high efficiency is shown by an area surrounded by three lines; a first line representing a boundary of the condition in which the light rays 5 are incident to only the blaze surface 6, a second line and a curve that are represented by connecting the points that are 98.5% with respect to the maximum efficiency by mathematizing the condition with high efficiency. These three lines are fitted, and respectively represented by the following formulas.

First, the second line is represented by formula (3):

$$θ=0.3663159ϕ+48.8441033 \quad (3)$$

Additionally, the curve representing the boundary of the condition with high efficiency is represented by formula (4):

$$θ=0.1127291ϕ^2-19.6745343ϕ+938.7421566 \quad (4)$$

That is, the area surrounded by three lines is represented by formula (5), in addition to the condition of the first line represented by the formula (2):

$$0.1127291ϕ^2-19.67453ϕ+938.74≤θ≤0.36631ϕ+48.84 \quad (5)$$

Thus, the vertex angle ϕ and the blaze angle θ may be designed so as to satisfy the above condition with high efficiency under the condition that the incident angle of light rays α is at 79.25 degrees (designing step), and the diffraction grating 1 may be formed so as to have the designed vertex angle ϕ and blaze angle θ (forming step). Accordingly, the diffraction grating 1 can obtain a high efficiency by using the relatively simple manufacturing method in which the processed surface accuracy of only the blaze surface 6 is made high.

Figure 4B:
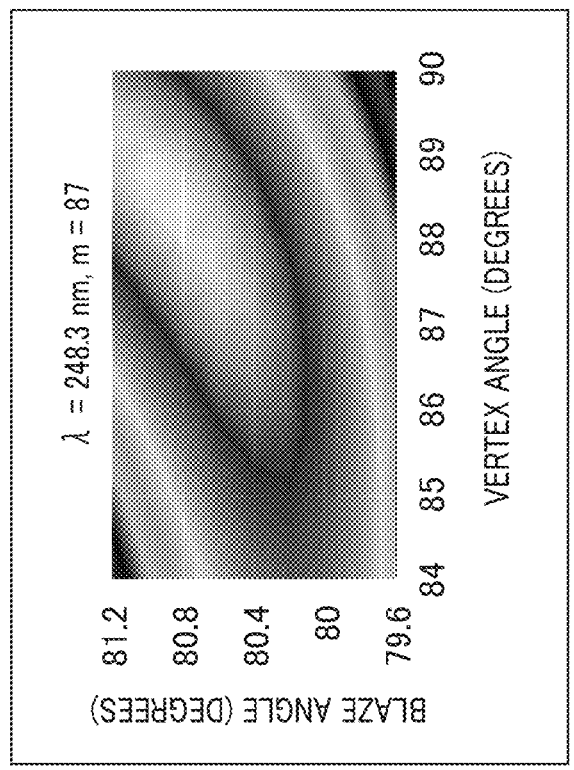
FIG. 4B is a graph illustrating the angular dependence of the efficiency when a wavelength $\lambda$ is 248.3 nm and an order m is 87.
Figure 4A:
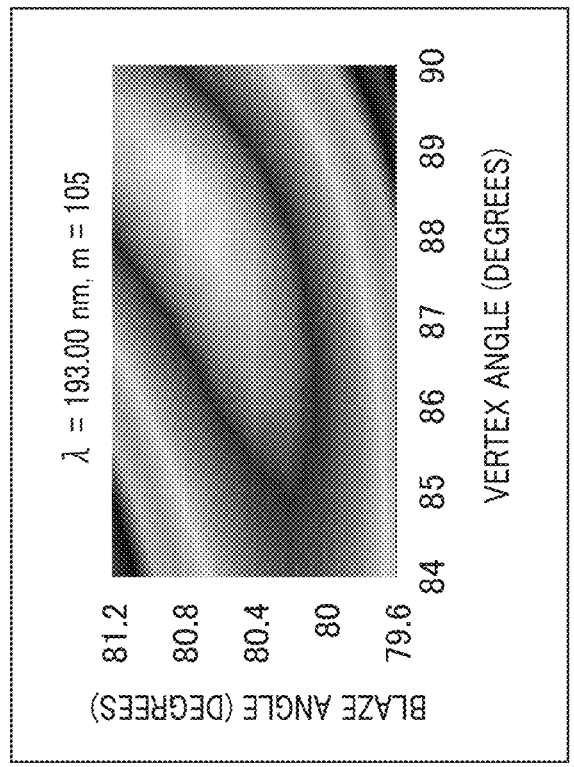
FIG. 4A is a graph illustrating the angular dependence of the efficiency when a wavelength $\lambda$ is 193.00 nm and an order m is 105.

Note that the change of the wavelength and the order condition in the far ultraviolet rays wavelength (in the range between 150 nm and 300 nm) under the condition that the incident angle of light rays α is 79.25 degrees mostly does not affect the angular dependence of the efficiency shown in FIG. 2. FIGS. 4A and 4B are graphs illustrating the angular dependence of the efficiency in a case where a different wavelength λ and order m are respectively used. FIG. 4A is a view enlarging a part of FIG. 2. In contrast, FIG. 4B illustrates a result of the similar calculation under a condition in which the grating interval d is 10.98673 μm according to the formula (1) when the incident angle of light rays α is 79.25 degrees, the wavelength λ is 248.3 nm, and the order m is 87. As evident from the comparison of FIG. 4A with FIG. 4B, the angular dependence of the efficiency mostly does not change. This is because the relation between the grating shape (triangular shape) and the incident angle of light rays α is always similar while the change of the wavelength λ and the order m induces the change of the grating interval d by the formula (1), so that the relation between the inner angels of the triangular shape and the efficiency are not affected.

Figure 10:
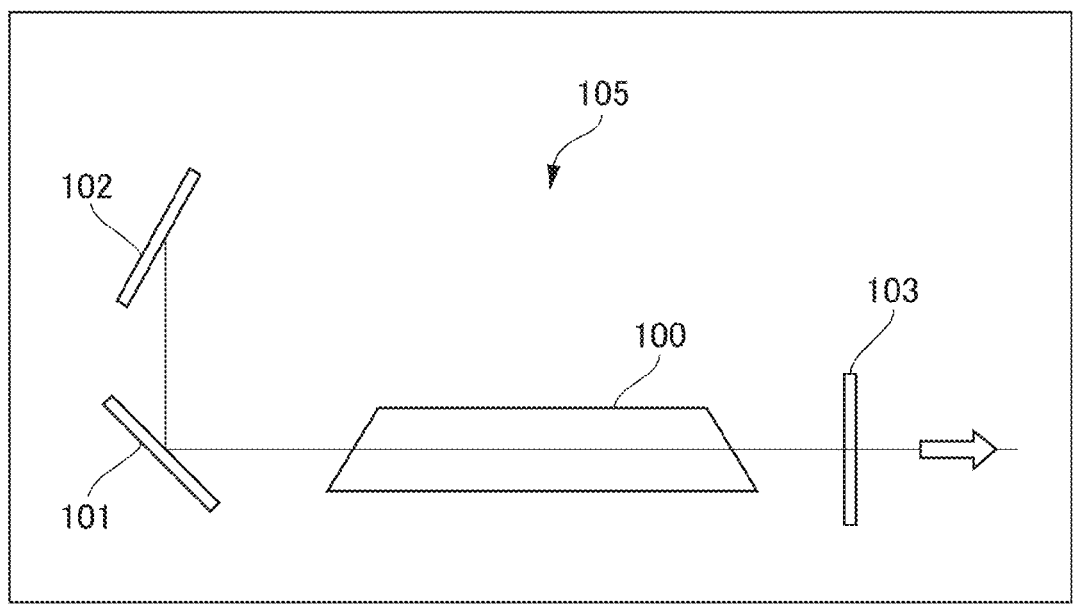
FIG. 10 illustrates a configuration of a laser apparatus capable of applying a diffraction grating according to the present invention.

As described above, the diffraction grating having a high diffraction efficiency and that is easily manufactured, and the manufacturing method of the diffraction grating can be provided, according to the present embodiments. Additionally, the laser apparatus by using the diffraction grating 1 according to the present embodiment is allowed to utilize the incident light without wasting it as less as possible and to efficiently generate laser. FIG. 10 is a schematic diagram illustrating a configuration of an excimer laser apparatus serving as a laser apparatus capable of applying the diffraction grating according to the present invention. The laser apparatus 105 is provided with a laser tube 100, a mirror 101, a diffraction grating 102, and an output mirror 103. Firstly, laser light is generated in the interior of the laser tube 100. The generated laser light passes through one of windows formed in the laser tube 100, and is reflected on the mirror 101. The reflected light on the mirror 101 is incident to the diffraction grating 102. Here, the diffraction grating 1 of the above embodiment may be applied to the laser apparatus 105 as the diffraction grating 102. In this case, the diffraction grating 102 is a reflection-type diffraction grating. The diffraction grating 102 diffracts light having a specific wavelength, at a specific order to generate light returning to the mirror 101. Accordingly, only light having a specific narrow wavelength band is reflected on the diffraction grating 102, and the band of the laser light is narrowed. Subsequently, the light returning to the mirror 101 is reflected on the mirror 101 again and is directed to the laser tube 100. The light is further amplified in the laser tube 100, passes through the other window of the laser tube 100 to be incident to the output mirror 103. The output mirror 103 transmits a portion of light, and reflects the other portion. The reflected light from the output mirror 103 returns to the laser tube 100 to be further amplified and further band-narrowed. If the diffraction grating 1 having high diffraction efficiency in the above embodiment is used as the diffraction grating 102, light loss may be suppressed and band-narrowed laser light may be generated. The diffraction grating 1 in the above embodiment may be used in a spectrometer, a wavelength meter or the like in addition to the laser apparatus 105.

Second Embodiment

Next, a description will be given of the diffraction grating according to a second embodiment of the present invention. The diffraction grating in which the incident angle of light rays $\alpha$ is 79.25 degrees is exemplified in the first embodiment. However, the incident angle of light rays $\alpha$ is considered as a variable in the present embodiment. Note that the same reference numerals are provided to each of the elements and the parts of the diffraction grating of the present embodiment corresponding to each of the elements and the parts of the diffraction grating 1 according to the first embodiment. Here, a condition in which the counter surface 9 is not incident to the light rays 5 is represented by formula (6):

$$\phi+\theta \leq 90+\alpha \tag{6}$$

Figure 5A:
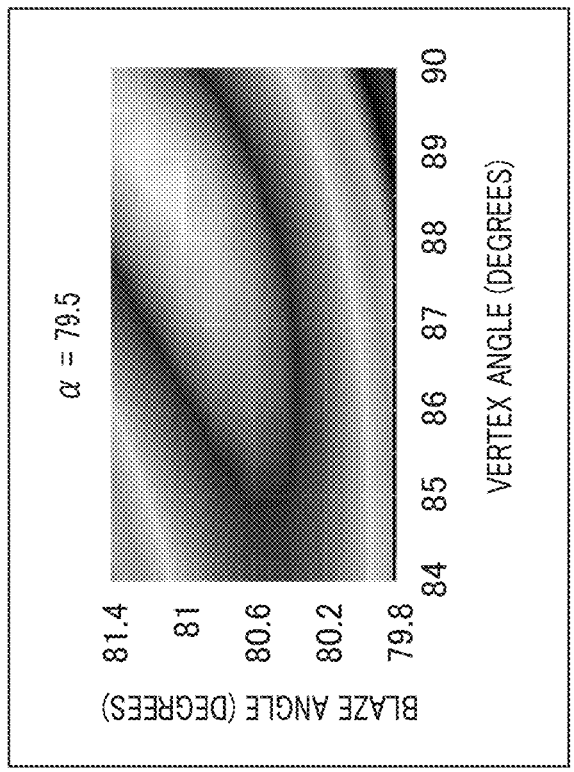
FIG. 5A is a graph illustrating the angular dependence of the efficiency when an incident angle of light rays is 79.1.
Figure 5B:
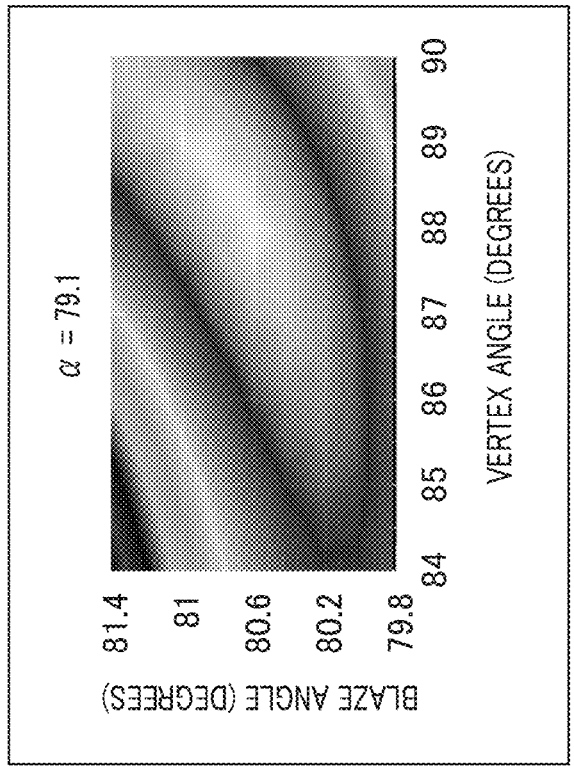
FIG. 5B is a graph illustrating the angular dependence of the efficiency when an incident angle of light rays is 79.5.

FIGS. 5A and 5B are graphs illustrating the angular dependence of the efficiency in which different values of the incident angle of light rays $\alpha$ are respectively used. Particularly, FIG. 5A illustrates a case in which the incident angle of light rays $\alpha$ is 79.1 degrees, and FIG. 5B illustrates a case in which the incident angle of light rays $\alpha$ is 79.5 degrees. As evident from the comparison of FIG. 5A with FIG. 5B, the graph shifts in an increasing direction in both of the horizontal axis direction and the vertical axis direction, with respect to the increase of the incident angle of light rays $\alpha$. The calculated results shown in FIGS. 5A and 5B allow determining an intersection point between the line of the condition with high efficiency and the curve of the condition with high efficiency described in the first embodiment, to each of the incident angle of light rays $\alpha$.

Figure 6:
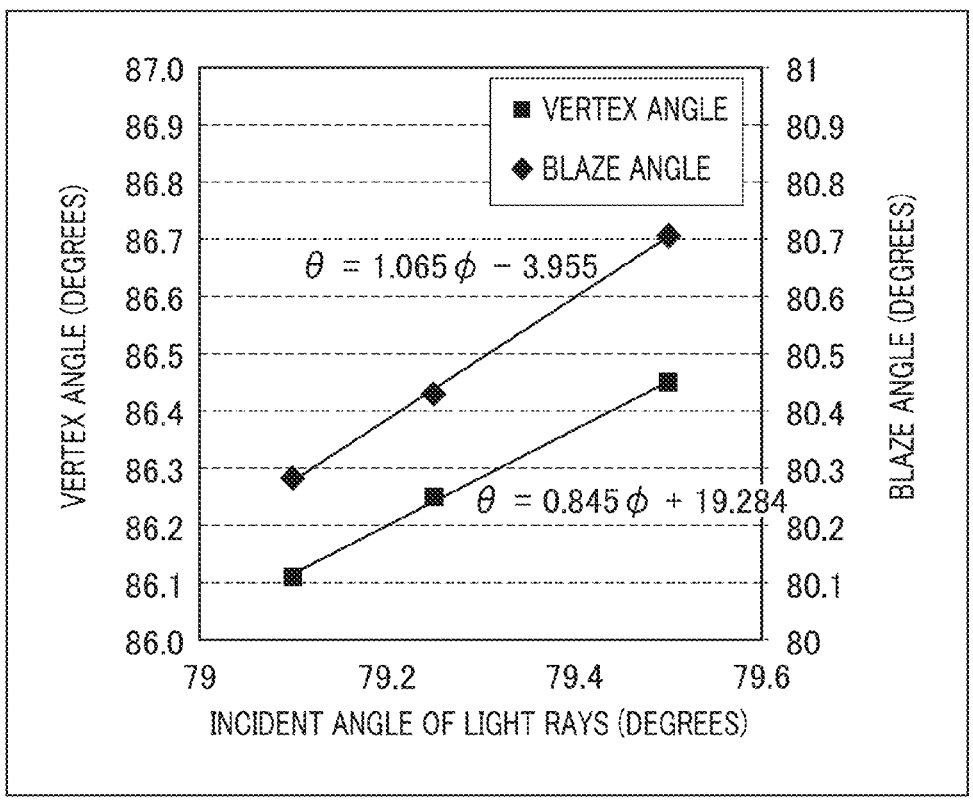
FIG. 6 is a graph illustrating variations of intersection points of each line of a condition with high efficiency to an incident angle of light rays.

FIG. 6 is a graph illustrating the change of the intersection point to each incident angle of light rays $\alpha$. FIG. 6 illustrates three cases as one example in which the incident angle of light rays $\alpha$ is 79.1 degrees, 79.5 degrees, and 79.25 degrees corresponding to the first embodiment. The result in FIG. 6 shows that the vertex angle $\phi$ (vertex angle of intersection point) and the blaze angle $\theta$ (blaze angle of intersection point) both of which become intersection points approximately linearly change with respect to the change of the incident angle of light rays $\alpha$. Specifically, the amount of change in the vertex angle of the intersection point is 0.845 times that of the incident angle of light rays $\alpha$. In contrast, the amount of change in the blaze angle of the intersection point is 1.065 times that of the incident angle of light rays $\alpha$. In this case, a coefficient of the above line and the above curve is almost the same even when the incident angle of light rays $\alpha$ changes, and the property of FIG. 2 only moves in parallel by the amount of the vertex angle $\phi$ and the blaze angle $\theta$ each obtained by multiplying the proportion with respect to the change of the incident angle of light rays $\alpha$.

Here, the conditional formulas proposed in the first embodiment are established when the incident angle of light rays is 79.25 degrees. In contrast, the amount of change in the incident angle of light rays $\alpha$ ($\alpha$−79.25) is denoted by $\sigma$ in the present embodiment. Thus, the angular dependence of the efficiency is almost equal to the case in which the vertex angle $\phi_d$ shifts at $\phi_d=0.845_\sigma$ or the blaze angle shifts at $\theta_d=1.065_\sigma$ to the property shown in FIG. 1. Accordingly, the condition with high efficiency in the present embodiment is represented by formula (7) in addition to the formula (6):

$$0.1127291(\phi-\phi_d)^2-19.67453(\phi-\phi_d)+938.74+ \\ \theta_d \leq 0.36631(\phi-\phi_d)+48.84+\theta_d \tag{7}$$

Consequently, the present embodiment can achieve an effect similar to the first embodiment even considering the incident angle of light rays $\alpha$ to be a variable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-045908 filed Mar. 10, 2014, which is hereby incorporated by reference herein in its entirety.

What is claimed is:

1. A reflection-type diffraction grating comprising:
   a grating, the cross section of which is an asymmetrical triangular shape,
   wherein given that $\theta$ denotes an angle in degrees between a short side and a base of the triangular shape, and $\phi$ denotes an angle in degrees between the short side and a long side of the triangular shape, and $\alpha$ denotes an incident angle of light in degrees to a normal of the base, the angles $\theta$ and $\phi$ satisfy a condition represented by the following formulas:

$\phi+\theta \leq 90+\alpha$, $0.1127291(\phi-\phi_d)^2-19.67453(\phi-\phi_d)+938.74+ \\ \theta_d \leq \theta \leq 0.36631(\phi-\phi_d)+48.84+\theta_d$ where $\phi_d=0.845\sigma$ and $\theta_d=1.065\sigma$, in $\sigma=\alpha-79.25$.

2. The diffraction grating according to claim 1, wherein the incident angle of the light is in a range between 79.1 degrees and 79.5 degrees.

3. The diffraction grating according to claim 2, wherein a wavelength of the light is in a range between 150 nm and 300 nm.

4. The diffraction grating according to claim 1, wherein a wavelength of the light is in a range between 150 nm and 300 nm.

5. A laser apparatus, the apparatus comprising:
   a reflection-type diffraction grating that has a grating, the cross section of which is an asymmetrical triangular shape,
   wherein given that $\theta$ denotes an angle in degrees between a short side and a base of the triangular shape, and $\phi$ denotes an angle in degrees between the short side and a long side of the triangular shape, and $\alpha$ denotes an incident angle of light in degrees to a normal of the base, the angles θ and φ satisfy a condition represented by the following formulas:

$$\phi+\theta \leq 90+\alpha,$$

$$0.1127291(\phi-\phi_d)^2-19.67453(\phi-\phi_d)+938.74+\theta_d \leq \theta \leq 0.36631(\phi-\phi_d)+48.84+\theta_d$$

where $\phi_d=0.845\sigma$ and $\theta_d=1.065\sigma$, in $\sigma=\alpha-79.25$; and
an output mirror.

6. A method for manufacturing a reflection-type diffraction grating that has a grating, the cross section of which is an asymmetrical triangular shape, the method comprising:
given that θ denotes an angle in degrees between a short side and a base of the triangular shape, and φ denotes an angle in degrees between the short side and a long side of the triangular shape, and α denotes an incident angle of light in degrees to a normal of the base, designing the angles θ and α by using the following conditional formulas so that the angles θ and α satisfy the following conditional formulas:

$$\phi+\theta \leq 90+\alpha,$$

$$0.1127291(\phi-\phi_d)^2-19.67453(\phi-\phi_d)+938.74+\theta_d \leq \theta \leq 0.36631(\phi-\phi_d)+48.84+\theta_d$$

where $\phi_d=0.845\sigma$ and $\theta_d=1.065\sigma$, in $\sigma=\alpha-79.25$; and
forming the grating so as to have the designed angles θ and φ.

* * * * *